United States Patent
Oohira et al.

(10) Patent No.: US 10,719,347 B2
(45) Date of Patent: Jul. 21, 2020

(54) CONTROL APPARATUS, CONTAINER STARTING METHOD, AND PROGRAM

(71) Applicant: NEC Corporation, Minato-ku, Tokyo (JP)

(72) Inventors: Mayo Oohira, Tokyo (JP); Tomohito Iguchi, Tokyo (JP); Kazuhiro Egashira, Tokyo (JP)

(73) Assignee: NEC CORPORATION, Tokyo (JP)

( * ) Notice: Subject to any disclaimer, the term of this patent is extended or adjusted under 35 U.S.C. 154(b) by 17 days.

(21) Appl. No.: 16/078,157

(22) PCT Filed: Jun. 28, 2016

(86) PCT No.: PCT/JP2016/069156
§ 371 (c)(1),
(2) Date: Aug. 21, 2018

(87) PCT Pub. No.: WO2018/003020
PCT Pub. Date: Jan. 4, 2018

(65) Prior Publication Data
US 2019/0056971 A1 Feb. 21, 2019

(51) Int. Cl.
*G06F 9/455* (2018.01)
*G06F 9/50* (2006.01)
*G06F 9/46* (2006.01)
*G06F 9/48* (2006.01)
*G06F 8/61* (2018.01)

(52) U.S. Cl.
CPC ......... *G06F 9/45558* (2013.01); *G06F 9/455* (2013.01); *G06F 9/45533* (2013.01); *G06F 9/46* (2013.01); *G06F 9/48* (2013.01); *G06F 9/50* (2013.01); *G06F 8/63* (2013.01); *G06F 2009/45562* (2013.01); *G06F 2009/45575* (2013.01); *G06F 2009/45595* (2013.01)

(58) Field of Classification Search
CPC combination set(s) only.
See application file for complete search history.

(56) References Cited

U.S. PATENT DOCUMENTS

| 9,847,915 B2 | 12/2017 | Ashwood-Smith et al. |
| 2012/0005346 A1* | 1/2012 | Burckart ............... G06F 9/5077 709/226 |

(Continued)

FOREIGN PATENT DOCUMENTS

| JP | 2016009486 A | 1/2016 |
| JP | 2016509412 A | 3/2016 |

OTHER PUBLICATIONS

Dirk Merkel, "Docker: Lightweight Linux Containers for Consistent Development and Deployment", Linux Journal, vol. 2014, Issue 239, Mar. 2014, pp. 76-91 (total 16 pages).

(Continued)

*Primary Examiner* — Charles M Swift

(57) ABSTRACT

A control apparatus comprises first to third parts. The first part manages an image, which is information required for execution of a container. The second part requests the third part to start a container corresponding to an image of a predetermined version. The third part instructs the container corresponding to the image of the predetermined version to be created in response to the request from the second part on the basis of the image managed by the first part.

8 Claims, 8 Drawing Sheets

(56) References Cited

U.S. PATENT DOCUMENTS

| | | | |
|---|---|---|---|
| 2014/0053150 A1* | 2/2014 | Barnett | G06F 9/455 718/1 |
| 2014/0201374 A1 | 7/2014 | Ashwood-Smith et al. | |
| 2015/0370586 A1 | 12/2015 | Cooper et al. | |
| 2016/0057102 A1 | 2/2016 | Wei et al. | |
| 2016/0127169 A1 | 5/2016 | Rosa de Sousa Teixeira et al. | |
| 2016/0182315 A1* | 6/2016 | Salokanto | H04L 41/5054 709/226 |
| 2017/0177877 A1* | 6/2017 | Suarez | G06F 16/2455 |
| 2017/0262307 A1* | 9/2017 | Venkatesh | G06F 16/1794 |
| 2017/0264684 A1* | 9/2017 | Spillane | H04L 67/1095 |
| 2018/0129479 A1* | 5/2018 | McPherson | G06F 11/3668 |
| 2018/0309747 A1* | 10/2018 | Sweet | H04L 63/0428 |

OTHER PUBLICATIONS

Communication dated Jun. 7, 2019 from European Patent Office in counterpart EP Application No. 16907253.5.

ETSI GS NFV-MAN 001 V1.1.1 (Dec. 2014) Network Functions Virtualisation (NFV); Management and Orchestration (retrieved on Jun. 14, 2016), <http://www.etsi.org/deliver/etsi_gs/NFV-MAN/001_099/001/01.01.01_60/gs_NFVMAN001v010101p.pdf>.

ETSI GS NFV-IFA 005 V2.1.1 (Apr. 2016) Network Functions Virtualisation (NFV); Management and Orchestration Or-Vi reference point—Interface and Information Model Specification (retrieved on Jun. 14, 2016), <http://www.etsi.org/deliver/etsi_gs/NFV-IFA/001_099/005/02.01.01_60/gs_nfv-ifa005v020101p.pdf>.

The Docker commands: Child commands (retrieved on Jun. 14, 2016), 3 pages, <https://docs.docker.com/engine/reference/commandline/>.

Developer Quick-Start: Welcome to Magnum's Developer Documentation! (retrieved on Jun. 14, 2016), 2 pages, <http://docs.openstack.org/developer/magnum/dev/dev-quickstart.html>.

International Search Report dated Aug. 30, 2016, from the International Bureau in counterpart International application No. PCT/JP2016/069156.

Written Opinion, dated Aug. 30, 2016 from the International Bureau in counterpart International application No. PCT/JP2016/069156.

Tadano Gen, "Kigyo infura o 'Yasuku' 'Yawarakaku' 'Tsukaiyasuku' suru Shinsedai Cloud", Nikkei Communications, 2015, No. 617, pp. 29 to 31.

"Kakugen de Kotsu Maru Wakari Server Cho Nyumon", Nikkei Linux, 2015, vol. 17, No. 7, 4 pages.

Horiba, K., et al., "Process Base Software Middlebox Architecture in NFV", The Transactions of the Institute of Electronics, Information and Communication Engineers B, 2015, vol. J98-B, No. 7, [online], 12 pages, ISSN: 1881-0209.

* cited by examiner

CONTROL APPARATUS, CONTAINER STARTING METHOD, AND PROGRAM

This application is a National Stage Entry of PCT/2016/069156 filed on Jun. 28, 2016, the contents of all of which are incorporated herein by reference, in their entirety.

TECHNICAL FIELD

The present invention relates to a control apparatus, container starting method, and program, and particularly to a control apparatus, container starting method, and program related to network function virtualization management orchestration.

BACKGROUND

NFV (Network Functions Virtualization) that realizes the functions of network apparatus by means of software using a virtual machine (VM) implemented on a virtualization layer such as a hypervisor (HV) on a server is known (for instance refer to Non-Patent Literature 1).

FIG. 7 is a drawing showing an outline of a network configuration in a virtualized environment. In FIG. 7, a VNF (Virtualized Network Function) 22 corresponds to an application running on a virtual machine (VM) on a server, and realizes a network function by means of software. A management function called an EM (Element Manager) 23, also known as EMS (Element Manage System), is provided for each VNF 22.

An NFVI (Network Functions Virtualization Infrastructure) 21 is an infrastructure on which hardware resources of a physical machine (PM) such as computing, storage, and network functions can flexibly treated as virtual hardware resources such as virtual computing, virtual storage, and a virtual network virtualized by a virtualization layer such as a hypervisor.

An NFV-Orchestrator (NFVO) 11 of an NFV MANO (NFV Management & Orchestration) 10 orchestrates the resources of the NFVI and manages the lifecycle of a network service (NS) instance (instantiation, scaling, termination, update, etc., of an NS instance).

A VNF Manager (VNFM) 12 manages the lifecycle of a VNF instance (for instance, instantiation, update, query, scaling, termination, etc.) and notifies events.

A Virtualized Infrastructure Manager (VIM) 13 controls and manages the computing, storage, and network resources of the NFVI 21 and failure monitoring and resource monitoring for the NFVI 21.

As for OSS/BSS 30, the OSS (Operations Support System) is a generic term for systems (equipment, software, mechanism, etc.) required for, for instance, telecommunications carriers to construct and operate services. The BSS (Business Support System) is a generic term for information systems (equipment, software, mechanism, etc.) that, for instance, telecommunications carriers use for billing and charging usage fees and customer services.

In the network system shown in FIG. 7, the VIM 13 manages an image file necessary for instantiating the VNF 22. The VIM 13 instantiates the VNF 22 by providing the image file to the NFVI 21. In a network system in a virtualized environment, a target software version can be specified by the VNF software image management interface described in "7.2.2 VNF software image management" of Non-Patent Literature 1. More specifically, in "Figure B.2: VNF Package on-boarding message flow" in "B.2.1 On-board VNF Package flow" of Non-Patent Literature 1, the NFVO 11 provides an image file to the VIM 13 using the software image management interface in response to a request from a sender. Note that the VNF software image management interface is referred to as the "Software Image Management Interface" in the chapter 7.2 of Non-Patent Literature 2.

The description above using FIG. 7 explains a virtualization technology in which a virtual machine (VM) is created by a virtual function (hypervisor) implemented on a physical machine (PM). In recent years, in addition to the virtualization technology using the virtual machine (VM), the virtualization technology using a container has gained attention. The container type virtualization technology has various advantages; an operating system (OS) is not required for each container, and a container can become available quickly on a physical machine (PM).

A container type virtualization technology uses software called container engine (the container engine is installed on a physical machine or virtual machine). In recent years, Docker comprising a stack management function related to an image of an application (virtual server) has been released as open source and is often used as a container engine.

Docker comprises a function of allowing an application to manage an implemented execution environment as an execution image, and the specifications of a Docker repository (also known as the Docker registry) that manages this image is published in Non-Patent Literature 3.

Further, a framework called "Magnum" for making a Docker container available in OpenStack is under consideration. Magnum is an OpenStack API (Application Programming Interface) and is able to construct and operate a Docker virtualized environment with commands.

For instance, with reference to FIG. 8, Docker provides a command (docker.build) for building a Docker image and registering it in a repository and a command (magnum.pod-create) for starting a Docker image. Further, Magnum interfaces, etc., are published in Non-Patent Literature 4.

[Non-Patent Literature 1]
ETSI GS NFV-MAN 001 V1.1.1 (2014-12) Network Functions Virtualisation (NFV); Management and Orchestration (retrieved on Jun. 14, 2016), <http://www.etsi.org/deliver/etsi_gs/NFV-MAN/001_099/001/01.01.01_60/gs_NFV-MAN001v010101p.pdf>

[Non-Patent Literature 2]
ETSI GS NFV-IFA 005 V2.1.1 (2016-04) Network Functions Virtualisation (NFV); Management and Orchestration Or-Vi reference point—Interface and Information Model Specification (retrieved on Jun. 14, 2016), <http://www.etsi.org/deliver/etsi_gs/NFV-IFA/001_099/005/02.01.01_60/gs_nfv-ifa005v020101p.pdf>

[Non-Patent Literature 3]
The Docker commands (retrieved on Jun. 14, 2016), <https://docs.docker.com/engine/reference/command-line/>

[Non-Patent Literature 4]
Developer Quick-Start (retrieved on Jun. 14, 2016), <http://docs.openstack.org/developer/magnum/dev/dev-quick-start.html>

SUMMARY

The disclosure of each document cited above is incorporated herein in its entirety by reference thereto. The following analysis is given by the present inventors.

Non-Patent Literature 1 assumes that the virtual function instance (VNF, virtual server) described therein is realized by a virtual machine (VM) using a hypervisor. In other words, Non-Patent Literature 1 does not take the container type virtualization technology, one of other virtualization technologies, into consideration. As a result, the VIM does not comprise the function of managing a container and cannot use a container type virtualization technology.

More concretely, since the VIM implemented according to the specifications defined in Non-Patent Literature 1 does not comprise the image stack management function (repository management) necessary for managing a container and Docker's allocate execution function, it cannot use a container type virtualization technology. In other words, Non-Patent Literature 1 shows how the VIM builds a virtual machine (VM) using a hypervisor, however, it does not describe how the VIM manages a container. As a result, a container cannot be used as virtualization means.

It is an object of the present invention to provide a control apparatus, container starting method, and program capable of using a container as virtualization means.

According to a first aspect of the present invention, there is provided a control apparatus comprising a first part for managing an image, which is information required for execution of a container, a second part for requesting a container corresponding to an image of a predetermined version to be started, and a third part for instructing the container corresponding to the image of the predetermined version to be created in response to the request from the second part on the basis of the image managed by the first part.

According to a second aspect of the present invention, there is provided a container starting method for a communication system including an NFVO (NFV-Orchestrator) that realizes a network service in a virtualized environment, a VIM (Virtualized Infrastructure Manager) that manages and controls the resources of a virtual function instance, and a repository that manages an image, which is information required for execution of a container; and the container starting method comprises having the NFVO request the VIM to start a container corresponding to an image of a predetermined version, and having the VIM instruct the container corresponding to the image of the predetermined version to be created in response to the request from the NFVO on the basis of the image managed by the repository.

According to a third aspect of the present invention, there is provided a program executed by a computer installed in a control apparatus including an NFVO (NFV-Orchestrator) that realizes a network service in a virtualized environment, a VIM (Virtualized Infrastructure Manager) that manages and controls the resources of a virtual function instance, and a repository that manages an image, which is information required for execution of a container; and the program executes a process of having the NFVO request the VIM to start a container corresponding to an image of a predetermined version, and a process of having the VIM instruct the container corresponding to the image of the predetermined version to be created in response to the request from the NFVO on the basis of the image managed by the repository.

Further, this program can be stored in a computer-readable storage medium. The storage medium may be a non-transient one such as a semiconductor memory, hard disk, magnetic storage medium, or optical storage medium. The present invention can be realized as a computer program product.

According to each aspect of the present invention, there is provided a control apparatus, container starting method, and program that contribute to making it possible to use a container as virtualization means.

PREFERRED MODES

Exemplary Embodiment 1

A first exemplary embodiment will be described in more detail with reference to the drawings. Note that the same signs will be given to the same elements in each exemplary embodiment, and the explanation will be omitted.

Figure 1:
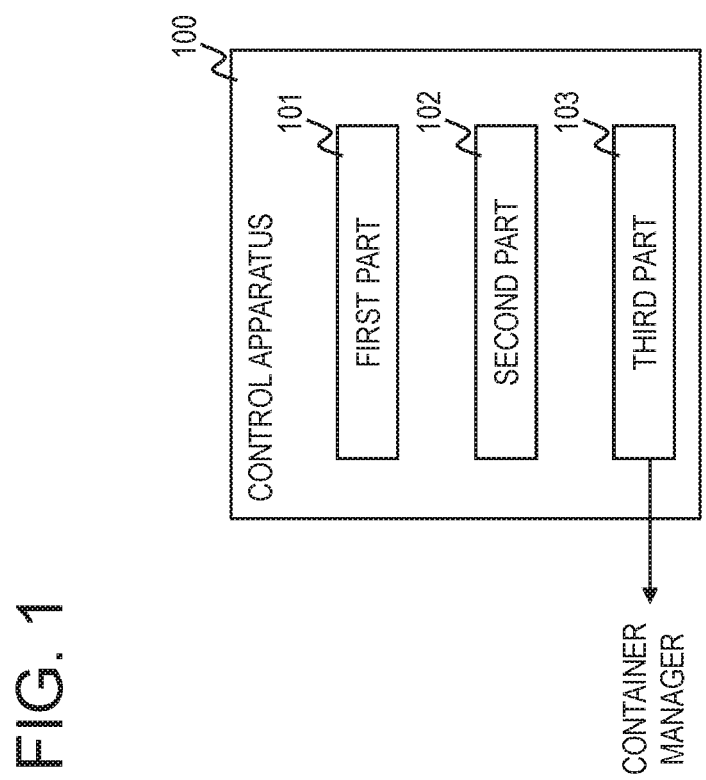
FIG. 1 is a block diagram showing a configuration example of a control apparatus relating to a first exemplary embodiment.

FIG. 1 is a block diagram showing a configuration example of a control apparatus 100 relating to the first exemplary embodiment. In FIG. 1, the control apparatus 100 comprises a first part 101 for managing a container image, a second part 102 that is a sub-module of the NFVO, and a third part 103 that is a sub-module of the VIM.

The first part 101 manages an image, which is information required for execution of a container. For instance, the first part 101 is a repository that manages the image.

The second part 102 requests the third part 103 to start a container. More specifically, the second part 102 requests the third part 103 to start a container that corresponds to an image of a predetermined version.

In response to the request from the second part 102, the third part 103 instructs, for instance, a container manager to create the container that corresponds to the image of the predetermined version on the basis of the image managed by the first part 101.

Figure 2:
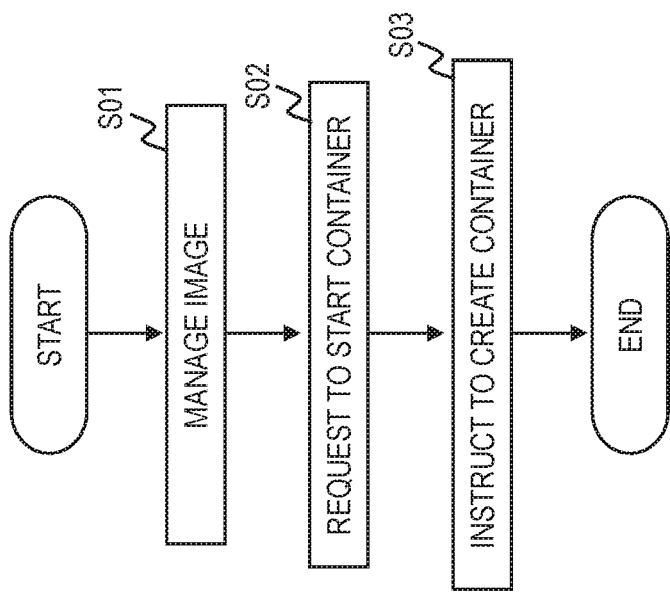
FIG. 2 is a flowchart showing an example of the operation of the control apparatus relating to the first exemplary embodiment.

The operation of the control apparatus 100 is shown in a flowchart in FIG. 2.

First, an image required for execution of a container is prepared. The prepared image is registered in the first part 101 and managed thereby (step S01).

Next, the second part 102 requests the third part 103 to start a container that corresponds to an image of a predetermined version (step S02).

Finally, in response to the request from the second part 102, the third part 103 instructs, for instance, a container manager to create a container that corresponds to the image of a predetermined version on the basis of the image managed by the first part 101 (step S03).

As described, the control apparatus 100 relating to the first exemplary embodiment comprises a function of managing a stack of images required to manage a container (repository management function; the first part 101) and Docker's allocate execution function (the third part 103). As a result, the control apparatus 100 relating to the first exemplary embodiment makes it possible to use a container as virtualization means in the VIM.

Exemplary Embodiment 2

A second exemplary embodiment will be described in more detail with reference to the drawings.

Figure 3:
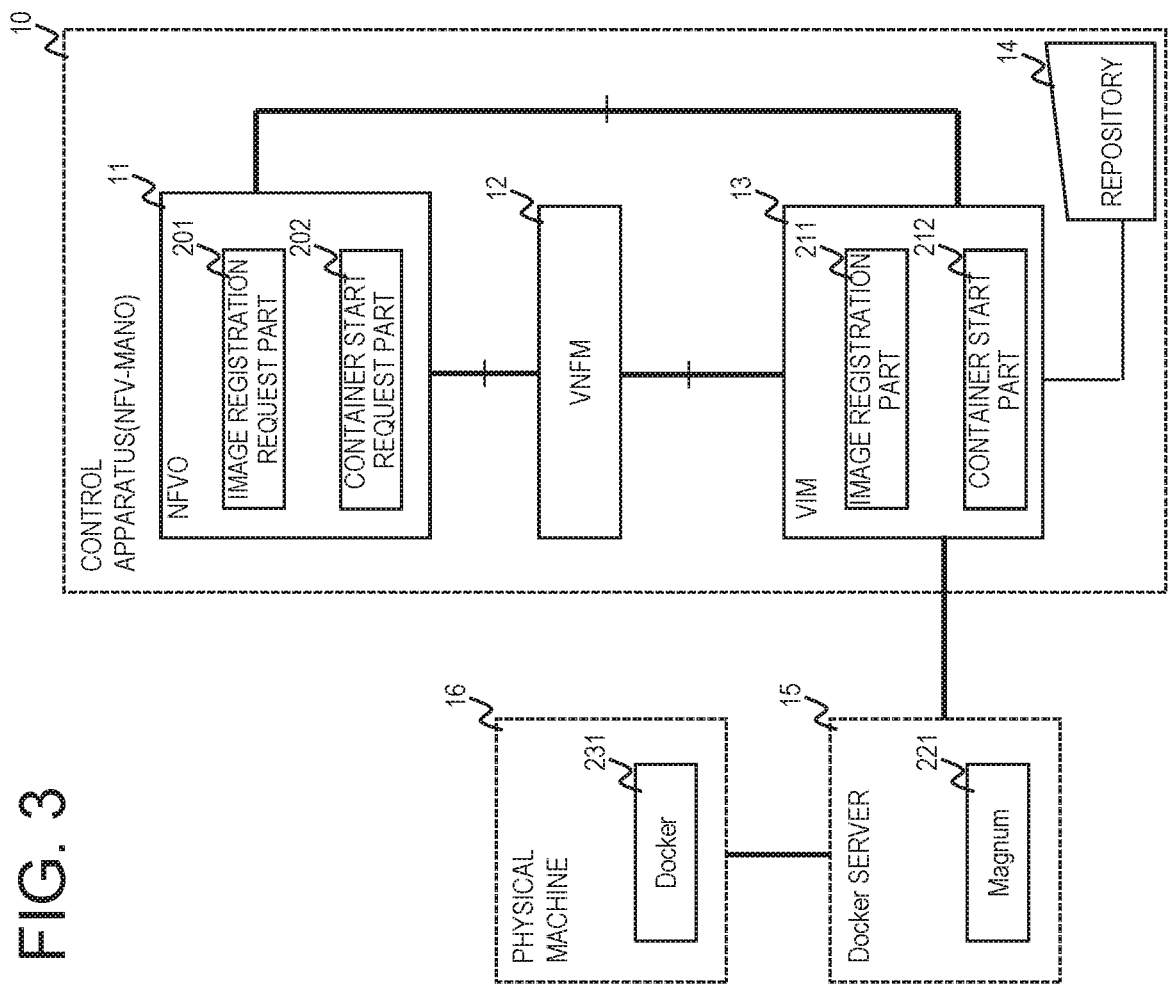
FIG. 3 is a drawing illustrating a configuration example of a communication system relating to a second exemplary embodiment.

FIG. 3 is a drawing illustrating a configuration example of a communication system relating to the second exemplary embodiment. In FIG. 3, the communication system includes a control apparatus 10, a Docker server 15, and a physical machine 16.

The control apparatus 10 is a network functions virtualization management and orchestration apparatus (NFV-MANO).

The Docker server 15 is a server on which Magnum 221 is implemented.

Docker 231 is implemented on the physical machine 16. Docker 231 provides a virtual function instance (VNF, virtual server) by starting a container and executing an application within the container on the basis of an instruction from Magnum 221.

The control apparatus 10 is constituted by including an NFV Orchestrator (NFVO) 11, a VNF Manager (VNFM) 12, a Virtualized Infrastructure Manager (VIM) 13, and a repository 14.

The repository 14 is a Docker repository that manages a container image used by Docker 231 of the physical machine 16. The repository 14 corresponds to the first part 101 described above.

The NFVO 11 realizes a network service in a virtualized environment. The NFVO 11 manages the lifecycle of an network service (NS) instance. The NFVO 11 includes an image registration request part 201 and a container start request part 202.

The image registration request part 201 comprises a function of requesting the VIM 13 to register a container image in the repository 14. More concretely, the image registration request part 201 requests the VIM 13 to register a container image in the repository 14 using the software image management interface defined in Non-Patent Literature 1. At this time, the image registration request part 201 specifies the version of the container image while requesting the VIM 13 to register the container image. Further, the image registration request part 201 associates the identifier (ID) of the container image obtained from the VIM 13 with the version information, generates image management information, and stores this information. The image management information is configured in such a way that the container start request part 202 can refer thereto.

The container start request part 202 comprises a function of requesting the VIM 13 to start a container corresponding to the image of a predetermined version. More concretely, the container start request part 202 identifies the identifier (ID) of an image corresponding to the version of the started container on the basis of the image management information (associations between the version information of container images and identifiers) stored by the image registration request part 201.

The container start request part 202 specifies a container image according to the identified identifier (ID) and requests the VIM to start the container. At this time, the container start request part 202 requests the VIM to start the container using the Virtualised Resources Management Interface defined in "7.3.3 Virtualised resources management" of Non-Patent Literature 1. The container start request part 202 corresponds to the second part 102 described above. It should be noted that the Virtualised Resources Management Interface is referred to as the "Virtualised Compute Resources Management Interface" in the chapter 7.3.1 of Non-Patent Literature 2.

The VNFM 12 manages the lifecycle of a virtual function instance.

The VIM 13 manages and controls the resources of a virtual function instance. The VIM 13 includes an image registration part 211 and a container start part 212.

The image registration part 211 is means for processing a container image registration request from the NFVO 11. Upon obtaining the registration request that includes the version information of a container image, the image registration part 211 converts the version information into information compatible with Docker's repository management interface. More specifically, the image registration part 211 converts the container image version information into Tag information (also referred to as "Tag").

Then the image registration part 211 specifies a Tag and requests the repository 14 to register the Tag therein. More specifically, the image registration part 211 specifies a Tag and issues a command (docker.build) for registering a Docker image to the repository 14.

As described, the image registration part 211 instructs the repository 14 to manage the Tag information of the container image while having it associated with the registered container image.

After having processed the request from the image registration part 211, the repository 14 notifies the image registration part 211 of an identifier (ID) corresponding to the registered Tag.

Then the image registration part 211 replies to the NFVO 11 informing that the container image has been registered. At this time, the image registration part 211 also notifies the NFVO 11 of the identifier (ID) notified by the repository 14. Further, the image registration part 211 stores the Tag information notified to the repository 14 and the identifier (ID) notified by the repository, having these two pieces of information associated with each other. The stored association is configured in such a way that the container start part 212 can refer thereto.

The container start part 212 instructs Magnum 221 to create a container corresponding to the image of a predetermined version on the basis of a request from the container start request part 202. The container start part 212 corresponds to the third part 103 described above.

More concretely, the container start part 212 converts an identifier obtained from the container start request part 202 so that it is compatible with the interface of Magnum 221. Specifically, the container start part 212 converts the identifier (ID) into a Tag in JSON (JavaScript (registered trademark) Object Notation) format. Then, in a command (magnum.pod-create) for starting a container, the container start part 212 specifies a Tag corresponding to the started container image and instructs Magnum 221 to start the container.

Next, the hardware of each apparatus constituting the communication system will be described.

Figure 4:
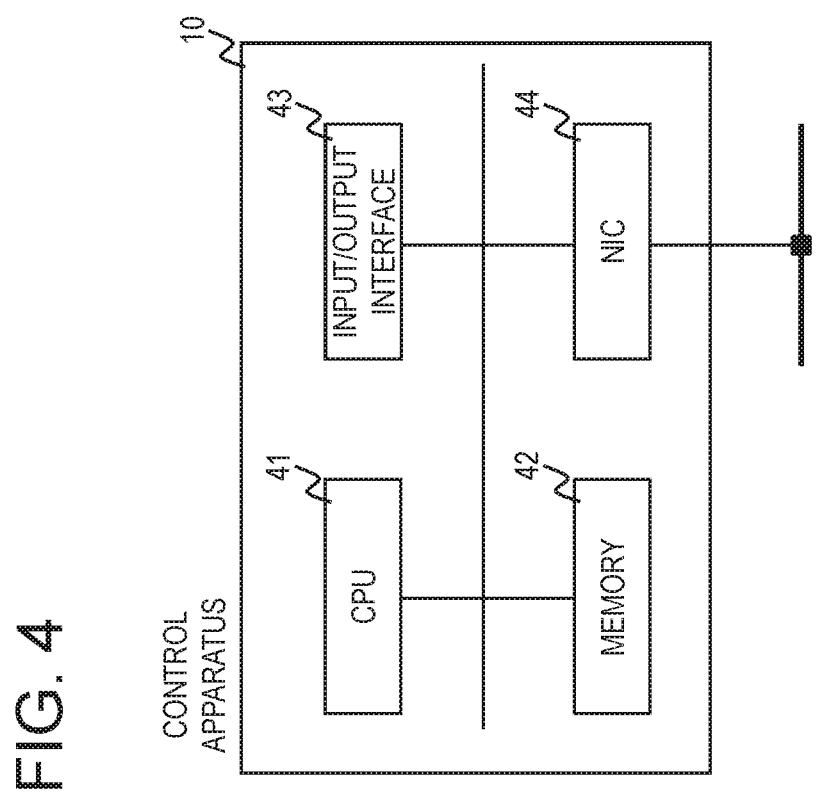
FIG. 4 is a block diagram showing an example of the hardware configuration of a control apparatus relating to the second exemplary embodiment.

FIG. 4 is a block diagram showing an example of the hardware configuration of the control apparatus 10 relating to the second exemplary embodiment. The control apparatus 10 can be constituted by an information processing apparatus (computer) and comprises the configuration illustrated in FIG. 4. For instance, the control apparatus 10 comprises a CPU (Central Processing Unit) 41, a memory 42, an input/output interface 43, and a NIC (Network Interface Card) 44, which is communication means, mutually connected to each other via an internal bus.

Note that the hardware configuration of the control apparatus 10 is not limited to the configuration shown in FIG. 4. The control apparatus 10 may include hardware not shown in the drawing. Further, the numbers of CPUs, etc., included in the control apparatus 10 are not limited to what is illustrated in FIG. 4, and for instance, a plurality of CPUs may be included in the control apparatus 10.

The memory 42 is a RAM (Random Access Memory) or ROM (Read Only Memory) module, or an auxiliary memory device (such as a hard disk).

The input/output interface 43 is means that serves as an interface for a display device and input device not shown in the drawing. The display device is, for instance, a liquid crystal display. The input device is, for instance, a device such as a keyboard or mouse that accepts a user operation.

Further, each processing module of the control apparatus 10 described above can be realized by, for instance, having the CPU 41 execute a program stored in the memory 42. The program can be updated by means of download via a network or using a storage medium storing the program. Further, the processing modules may be realized by semiconductor chips. In other words, means for executing the functions performed by the processing modules using some kind of hardware and/or software is needed.

The hardware configurations of the Docker server 15 and the physical machine 16 shown in FIG. 3 are basically the same as that of the control apparatus 10, and the explanation will be omitted since it is readily apparent to those skilled in the art.

Next, the operation of the communication system relating to the second exemplary embodiment will be described.

Figure 5:
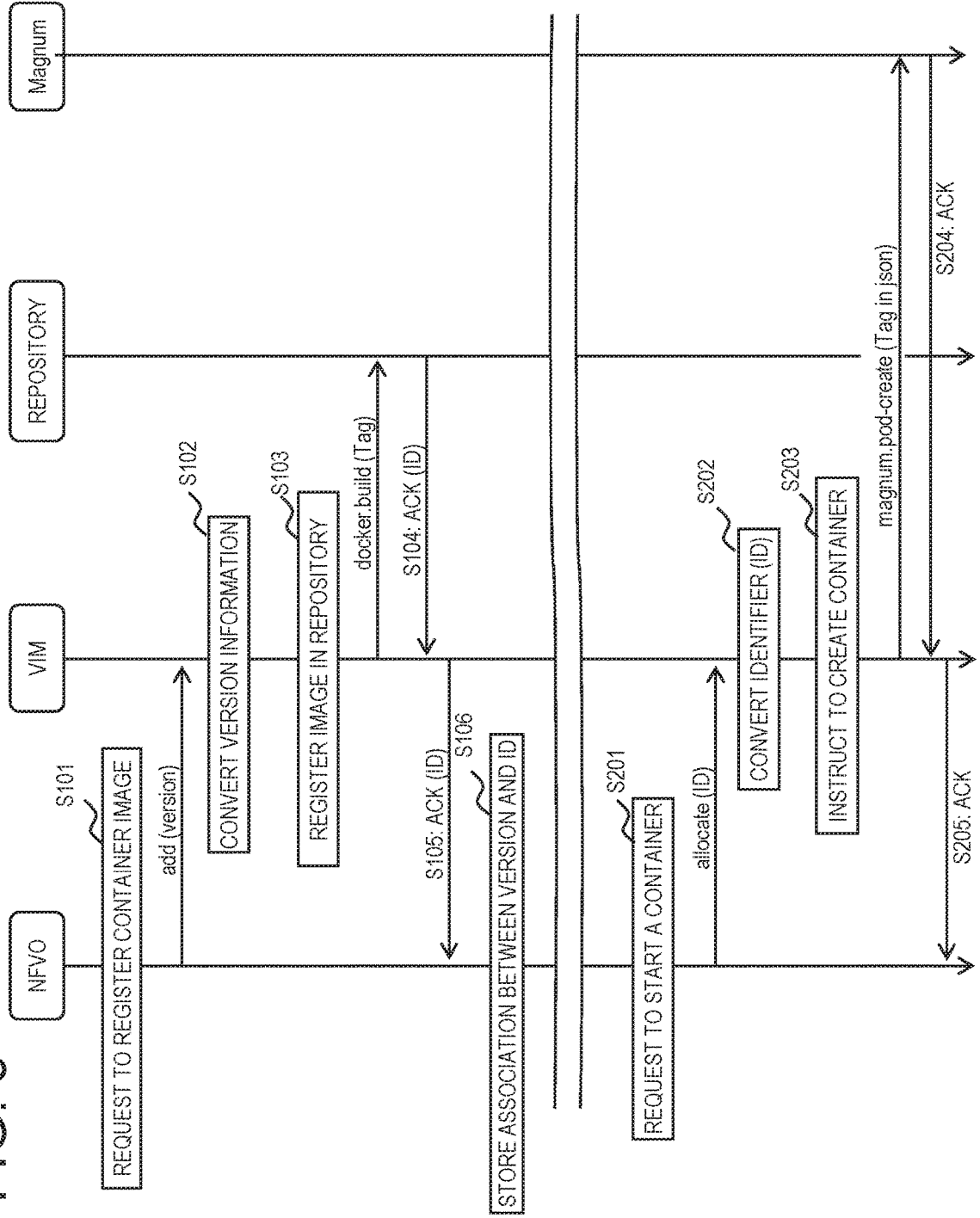
FIG. 5 is a sequence diagram showing an example of the operation of the communication system relating to the second exemplary embodiment.

FIG. 5 is a sequence diagram showing an example of the operation of the communication system relating to the second exemplary embodiment.

Upon receiving a request relating to the registration of a container image from an OSS, the NFVO 11 provides a container image to the VIM 13. Specifically, the NFVO 11 specifies a version and requests the VIM 13 to register an image corresponding to this version (step S101).

The VIM 13 converts the version information specified by the NFVO 11 into Tag information (Tag) compatible with the repository management interface (docker.build command) in the Docker repository (step S102).

While providing the container image to the repository 14, the VIM 13 requests the repository 14 to register the container image with the Tag converted from the version information (version string) (step S103).

The repository 14 processes the request and registers the container image. After completing the registration of the container image, the repository 14 notifies the VIM 13 thereof and returns an identifier (ID) corresponding to the registered Tag to the VIM 13 (step S104).

The VIM 13 informs the NFVO 11 that the container image has been registered in the repository 14 (step S105). At this time, the VIM 13 notifies the NFVO 11 of the identifier (ID).

Then the NFVO 11 generates image management information by associating the version information of the container image with the identifier (ID) corresponding to the version information and stores the information (step S106).

The processes in the steps S101 to S106 described above complete the registration of the container image in the repository 14.

Next, the operation of starting a container will be described.

Upon receiving a request for starting a container from an OSS, the NFVO 11 specifies a version and requests the VIM 13 to start a container of an image corresponding this version (step S201). More specifically, the NFVO 11 refers to the image management information generated in the step S106 and specifies an image identifier (ID) corresponding to the version of the container to be started. The NFVO 11 requests the VIM 13 to start the container using the specified identifier (ID).

In response to the request from the NFVO 11, the VIM 13 converts the specified identifier (ID) so that it is compatible with the interface of Magnum 221 (step S202).

Then the VIM 13 instructs Magnum 221 to start the container using the interface of Magnum 221 (step S203). At this time, the VIM 13 specifies a Tag converted from the identifier (ID) and issues a predetermined command (magnum.pod-create) to Magnum 221. Magnum 221 operates according to the command, the container image corresponding to the specified Tag is pulled out from the repository 14, and the desired container is started.

After the container has started, Magnum 221 transmits an Acknowledgment (ACK) to the VIM 13 (step S204), and the VIM 13 transmits to the NFVO 11 an Acknowledgment to the container start request (step S205).

The processes in the steps S201 to S205 described above complete the process of starting a container in the physical machine 16.

As described, the control apparatus 10 relating to the second exemplary embodiment converts the version information and identifiers (IDs) so that they are compatible with the interface demanded by a Docker repository (the repository 14) and Magnum 221. As a result, a container becomes available as virtualization means. In other words, in cooperation with the image stack management function of a Docker repository, the control apparatus 10 makes it possible to specify a target software version and start a container according to the software image management interface defined in Non-Patent Literature 1.

Exemplary Embodiment 3

A third exemplary embodiment will be described in more detail with reference to the drawings.

In the second exemplary embodiment described above, Magnum is utilized as a container manager and Docker is used as a container engine. These, however, are only examples, and container managers and container engines are not limited thereto.

Figure 6:
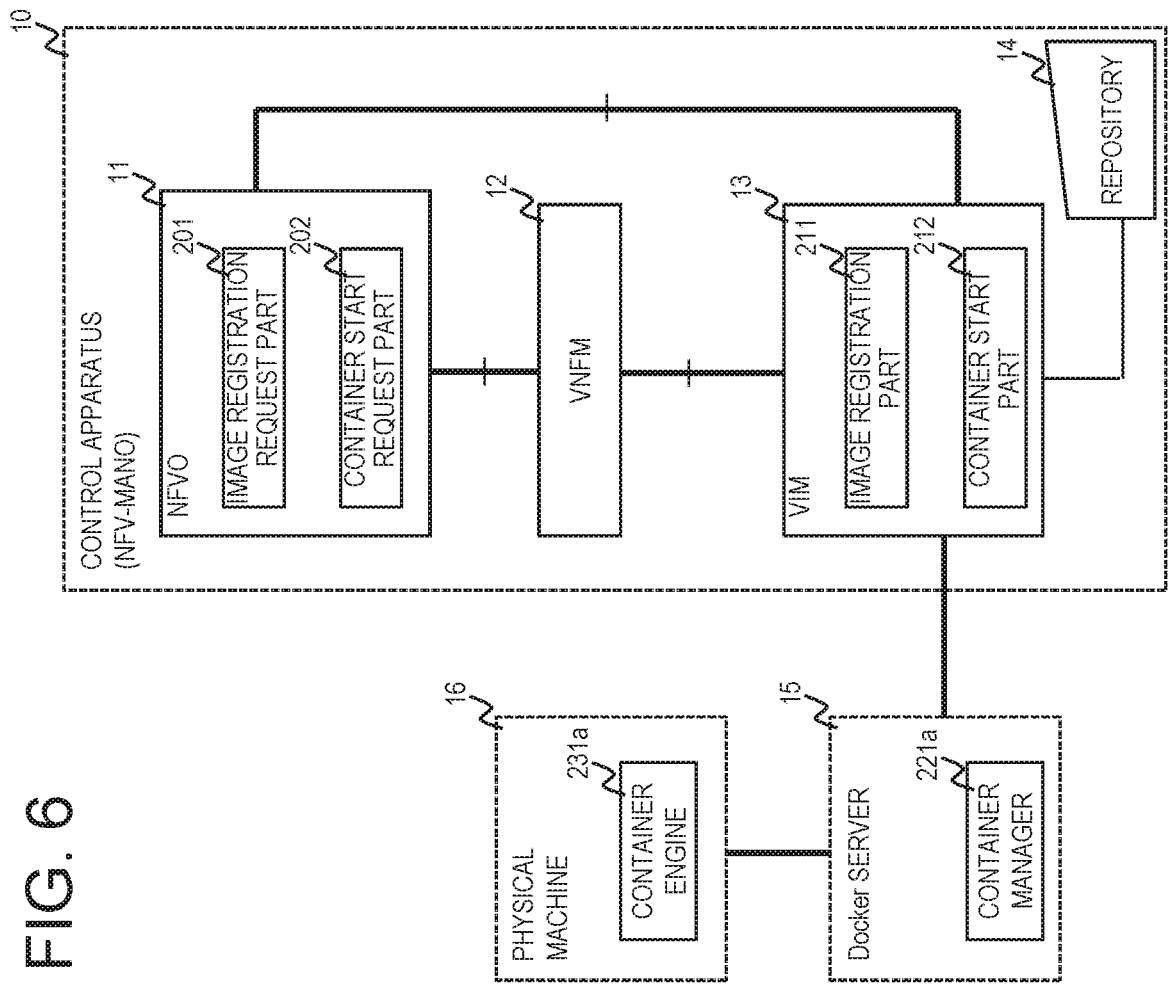
FIG. 6 is a drawing illustrating a configuration example of a communication system relating to a third exemplary embodiment.
Figure 7:
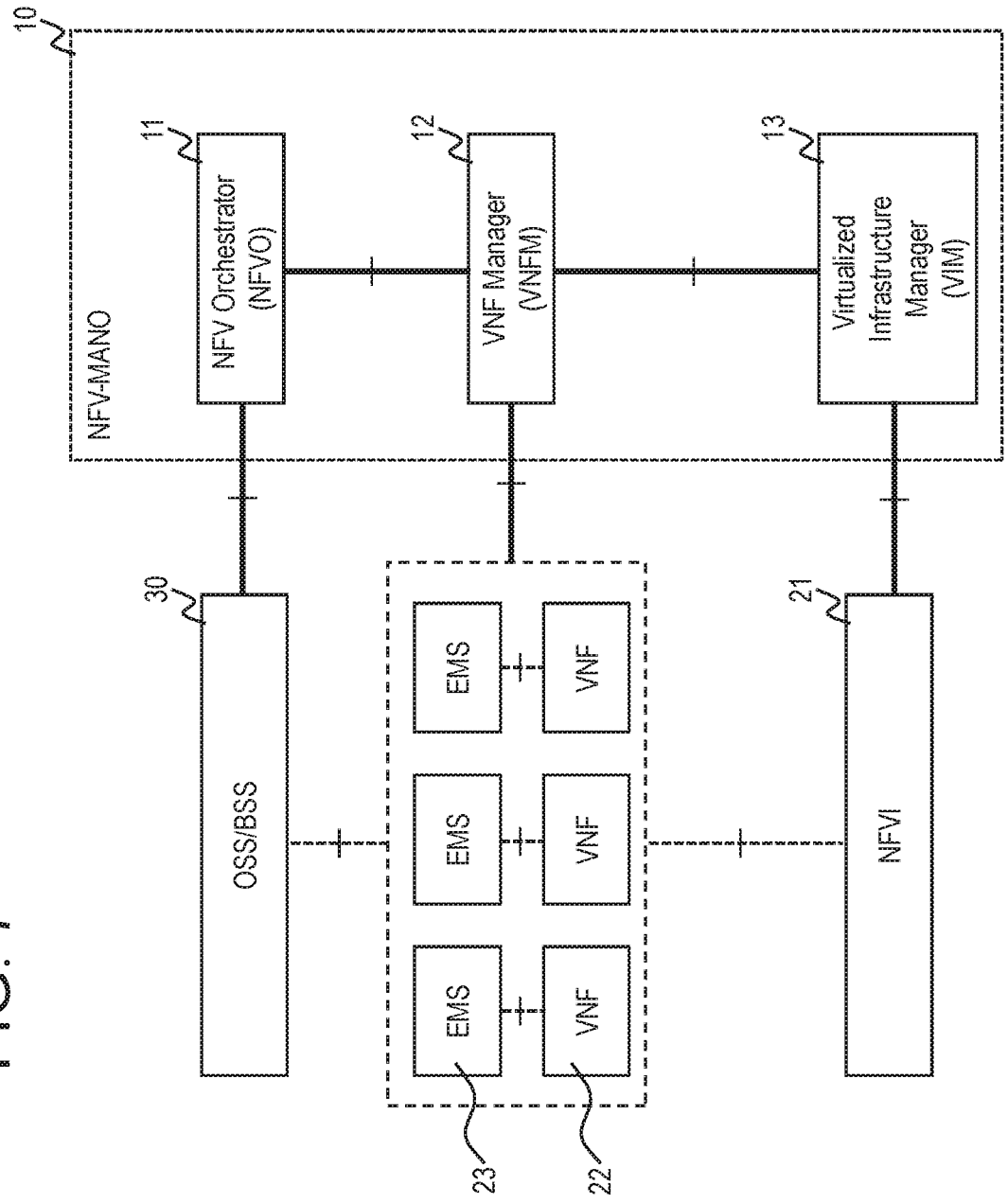
FIG. 7 is a drawing showing an outline of a network configuration in a virtualized environment.
Figure 8:
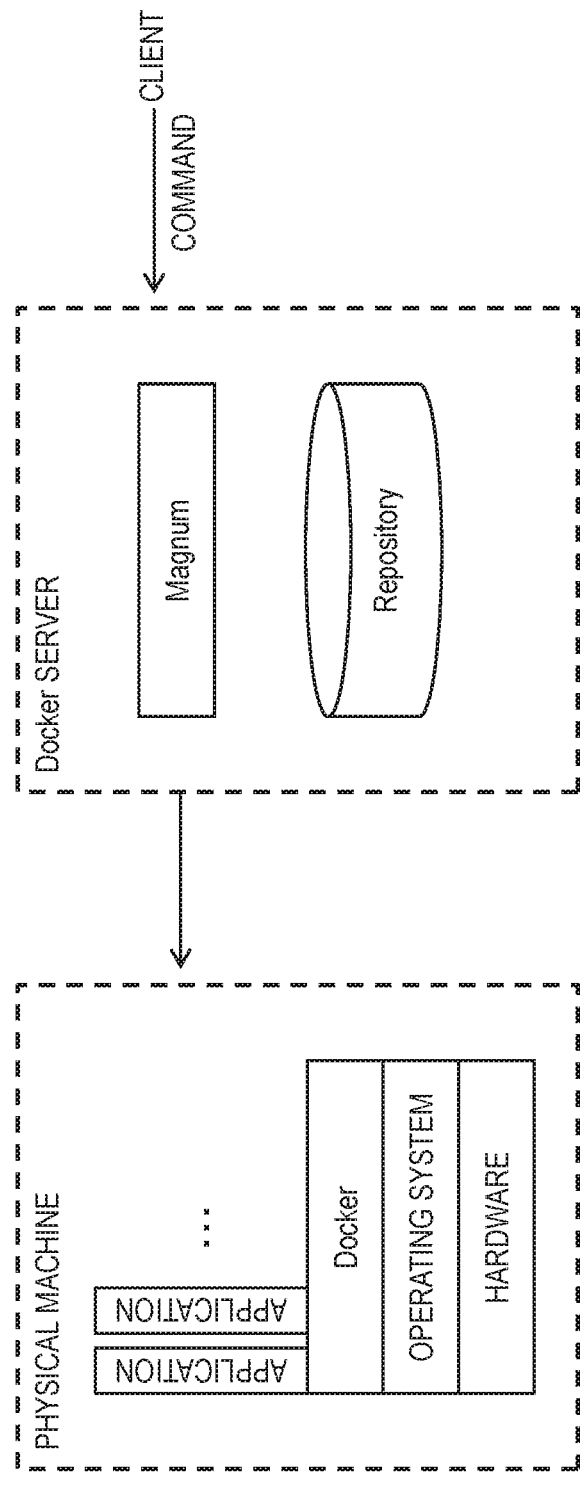
FIG. 8 is a drawing for explaining a container type virtualization technology.

As shown in FIG. 6, it is possible to use other general purpose software and frameworks. In this case, when registering a container image in the repository 14 and starting a container, the control apparatus 10 can convert the version information and identifiers (IDs) so that they are compatible with the interface of a container manager 221a.

More specifically, the image registration part 211 converts the version information notified by the image registration request part 201 into first information for identifying the container image to be registered so that the version information is compatible with the interface demanded by the repository 14, which is a repository of a container engine 231a. After the image corresponding to the first information has been registered, the repository 14 notifies the image registration part 211 of second information corresponding to the first information as the identifier of the registered image. The second information is forwarded to the image registration request part 201 and is managed as the image management information while being associated with the version information. When requesting the container start part 212 to start a container, the container start request part 202 refers to the image management information and notifies the container start part 212 of the second information corresponding to the image of the container to be started. The container start part 212 converts the second information into the first information, notifies the container manager 221a of this converted information, and instructs the container manager 221a to start the container.

According to the third exemplary embodiment, even when general purpose container engine and container manager are used, a container becomes available as virtualization means.

The configuration and operation of the communication systems described in the first to the third exemplary embodiments are examples, and various modifications are possible.

For instance, the repository 14 is directly connected to the VIM 13 in the communication system shown in FIG. 3, however, the repository 14 may be provided inside the Docker server 15. Alternatively, Magnum 221 implemented on the Docker server 15 may be implemented on the server same as that of the control apparatus 10.

In the exemplary embodiments described above, the NFVO 11 and the VIM 13 register a container image and start a container by exchanging information, however, these functions may be achieved through the VNFM 12.

Further, an application executed within a container is a virtual function instance (VNF; virtual server) in the exemplary embodiments described above, however, the VIM 13 may manage the resources of a VNF realized on a virtual machine (VM). In this case, the VIM 13 manages the repository 14 that registers a container image and a repository (not shown in FIG. 3, etc.) that registers a virtual machine (VM) image.

Some or all of the exemplary embodiments described above may also be described as follows without being limited thereto.

[Note 1]
As the control apparatus relating to the first aspect described above.

[Note 2]
The control apparatus according to Note 1 further comprising:
a registration request part for requesting an image to be registered; and
a registration part for registering the requested image in the first part.

[Note 3]
The control apparatus according to Note 2, wherein
for requesting the registration part to register the image, the registration request part notifies version information of a registered image, and
the registration part converts the notified version information into first information for identifying the registered image so that the version information is compatible with an interface demanded by the first part.

[Note 4]
The control apparatus according to Note 3, wherein
the first part notifies the registration part of second information corresponding to the first information as an identifier of the registered image after the image corresponding to the first information has been registered.

[Note 5]
The control apparatus according to Note 4, wherein
the registration part notifies the registration request part of the second information notified by the first part.

[Note 6]
The control apparatus according to Note 5, wherein
the registration request part generates image management information by associating the version information of the image requested to be registered and the notified second information.

[Note 7]
The control apparatus according to Note 6, wherein
the second part refers to the image management information and notifies the third part of the second information corresponding to the image of a container to be started for requesting the third part to start the container.

[Note 8]
The control apparatus according to Note 7, wherein
the third part converts the notified second information so that the second information is compatible with an interface demanded by a container manager for instructing the container manager to create a container.

[Note 9]
As the container starting method relating to the second aspect described above.

[Note 10]
As the program relating to the third aspect described above.
Further, the modes of Notes 9 and 10 can be developed into the modes of Notes 2 to 8 as the mode of Note 1.

Further, the disclosure of each Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a numeric value or small range example included in these ranges even in cases where no explanation is provided.

What is claimed is:
1. A control apparatus, comprising:
a repository configured to manage an image, which is information required for execution of a container;
a NFVO (NFV-Orchestrator) configured to realize a network service in a virtualized environment,
wherein the NFVO comprises a request part configured to request a container corresponding to an image of a predetermined version to be started; and
a VIM (Virtualized Infrastructure Manager) configured to instruct the container corresponding to the image of the predetermined version to be created in response to the request from the NFVO using the image managed by the repository;
wherein the NFVO comprises a registration request part for requesting an image to be registered,
wherein the VIM comprises a registration part for registering the requested image in the repository,
wherein, for requesting the registration part to register the image, the registration request part notifies version information of a registered image, and
wherein the registration part converts the notified version information into first information for identifying the registered image so that the version information is compatible with an interface demanded by the repository.

2. The control apparatus according to claim 1, wherein the repository notifies the registration part of second information corresponding to the first information as an identifier of the registered image after the image corresponding to the first information has been registered.

3. The control apparatus according to claim 2, wherein the registration part notifies the registration request part of the second information notified by the repository.

4. The control apparatus according to claim 3, wherein the registration request part generates image management information by associating the version information of the image requested to be registered and the notified second information.

5. The control apparatus according to claim 4, wherein the NFVO refers to the image management information and notifies the VIM of the second information corresponding to the image of a container to be started for requesting the VIM to start the container.

6. The control apparatus according to claim 5, wherein the VIM converts the notified second information so that the second information is compatible with an interface demanded by a container manager for instructing the container manager to create a container.

7. A container starting method for a communication system including:
   a NFVO (NFV-Orchestrator) configured to realize a network service in a virtualized environment;
   a VIM (Virtualized Infrastructure Manager) configured to manage and control the resources of a virtual function instance; and
   a repository configured to manage an image, which is information required for execution of a container,
   wherein the container starting method comprises:
      having a request part of the NFVO notify version information of a registered image for requesting a registration part of the VIM to register the image;
      having the VIM convert the notified version information into first information for identifying the registered image so that the version information is compatible with an interface demanded by the NFVO;
      having the NFVO request the VIM to start a container corresponding to an image of a predetermined version; and
      having the VIM instruct the container corresponding to the image of the predetermined version to be created in response to the request from the NFVO using the image managed by the repository.

8. A non-transitory computer-readable recording medium storing a program configured to be executed by a computer installed in a control apparatus including:
   a NFVO (NFV-Orchestrator) configured to realize a network service in a virtualized environment;
   a VIM (Virtualized Infrastructure Manager) configured to manage and control the resources of a virtual function instance; and
   a repository configured to manage an image, which is information required for execution of a container,
   wherein, if executed, the program executes a method comprising:
      a process of having a request part of the NFVO notify version information of a registered image for requesting a registration part of the VIM to register the image;
      a process of having the VIM convert the notified version information into first information for identifying the registered image so that the version information is compatible with an interface demanded by the NFVO;
      a process of having the NFVO request the VIM to start a container corresponding to the image of a predetermined version; and
      a process of having the VIM instruct the container corresponding to an image of the predetermined version to be created in response to the request from the NFVO using the image managed by the repository.

* * * * *